(12) United States Patent
Porter et al.

(10) Patent No.: US 12,297,106 B2
(45) Date of Patent: May 13, 2025

(54) METHODS AND SYSTEMS FOR PRODUCING SULFUR-CONTAINING PRODUCTS

(71) Applicant: Applied Technology Limited Partnership, Doraville, GA (US)

(72) Inventors: Nathan Joseph Porter, Herriman, UT (US); Benjamin Thomas Egelske, Greenville, SC (US); Hunter Orion Brown, Easley, SC (US); Robert J. Gulotty, Jr., Greer, SC (US)

(73) Assignee: Applied Technology Limited Partnership, Doraville, GA (US)

( * ) Notice: Subject to any disclaimer, the term of this patent is extended or adjusted under 35 U.S.C. 154(b) by 0 days.

(21) Appl. No.: 18/415,959

(22) Filed: Jan. 18, 2024

(65) Prior Publication Data

US 2024/0409408 A1    Dec. 12, 2024

Related U.S. Application Data

(60) Provisional application No. 63/507,543, filed on Jun. 12, 2023.

(51) Int. Cl.
    *C01B 17/76*             (2006.01)
    *B01D 53/00*             (2006.01)
    (Continued)

(52) U.S. Cl.
    CPC ............ *C01B 17/76* (2013.01); *B01D 53/002* (2013.01); *B01D 53/14* (2013.01); *B01D 53/22* (2013.01);
    (Continued)

(58) Field of Classification Search
None
See application file for complete search history.

(56) References Cited

U.S. PATENT DOCUMENTS 1,605,004 A * 11/1926 Shapleigh ............... C01B 17/76
                                                        423/522
2,849,496 A * 8/1958 Hakala .................... C07C 11/04
                                                        568/890

(Continued)

FOREIGN PATENT DOCUMENTS

AU         2013202363 A1    5/2013
EP            0050527 A1    4/1982
(Continued)

OTHER PUBLICATIONS

International Search Report and Written Opinion issued in international application No. PCT/US2024/011932, dated May 15, 2024 (12 pages).

*Primary Examiner* — Anthony J Zimmer
*Assistant Examiner* — Zachary John Baum
(74) *Attorney, Agent, or Firm* — Eversheds Sutherland (US) LLP

(57) ABSTRACT

Methods and systems for producing sulfuric acid and/or sulfur trioxide, which may include contacting a first stream that includes oxygen and a second stream that includes sulfur to produce a third stream that includes sulfur dioxide, and subjecting the third stream to an oxidation reaction to produce a fourth stream that includes sulfur trioxide. The contacting of the first and second streams may include contacting a molar amount of oxygen that exceeds a molar amount of sulfur.

30 Claims, 2 Drawing Sheets

(51) Int. Cl.
  *B01D 53/02* (2006.01)
  *B01D 53/14* (2006.01)
  *B01D 53/22* (2006.01)
  *C01B 13/02* (2006.01)
  *C01B 17/90* (2006.01)
(52) U.S. Cl.
  CPC .......... *C01B 13/0259* (2013.01); *C01B 17/90* (2013.01); *B01D 53/02* (2013.01)

(56) References Cited

U.S. PATENT DOCUMENTS

| | | | | |
|---|---|---|---|---|
| 2,862,791 | A | * | 12/1958 | Stiles ...................... C01B 17/90 |
| | | | | 585/802 |
| 3,455,652 | A | * | 7/1969 | James .................. C01B 17/762 |
| | | | | 423/536 |
| 3,803,297 | A | | 4/1974 | Guth et al. |
| 4,010,246 | A | * | 3/1977 | Steinrotter .............. C01B 17/54 |
| | | | | 95/228 |
| 4,046,866 | A | | 9/1977 | Hurlburt et al. |
| 4,419,337 | A | | 12/1983 | Jagodzinski et al. |
| 5,194,239 | A | | 3/1993 | Masseling et al. |
| 5,306,577 | A | * | 4/1994 | Sprouse ................. H01M 8/186 |
| | | | | 429/442 |
| 8,679,447 | B2 | | 3/2014 | Hall et al. |
| 2004/0086451 | A1 | | 5/2004 | Labrana Valdivia et al. |
| 2006/0129016 | A1 | * | 6/2006 | Anderson ................. C07C 2/62 |
| | | | | 585/731 |

FOREIGN PATENT DOCUMENTS

| | | |
|---|---|---|
| WO | 2008087252 A1 | 7/2008 |
| WO | 2023072901 A1 | 5/2023 |

* cited by examiner

METHODS AND SYSTEMS FOR PRODUCING SULFUR-CONTAINING PRODUCTS

CROSS-REFERENCE TO RELATED APPLICATIONS

This application claims priority to U.S. Provisional Patent Application No. 63/507,543, filed Jun. 12, 2023, which is incorporated herein by reference.

BACKGROUND

Sulfur trioxide ($SO_3$) is a valuable compound with numerous uses. For example, sulfur trioxide may be used in the production of sulfuric acid. Sulfur trioxide also may be used as a sulfonating agent, an oxidant, or a Lewis acid.

Despite its usefulness, there are few, if any, economically feasible sources of sulfur trioxide.

There remains a need for improved methods and systems, such as economically advantageous methods and systems, for producing sulfuric acid and/or sulfur trioxide, including, but not limited to, liquid sulfur trioxide.

BRIEF SUMMARY

In one aspect, methods of producing sulfuric acid and/or sulfur trioxide are provided. In some embodiments, the methods include providing a first stream that includes oxygen; providing a second stream that includes sulfur; contacting the first stream and the second stream to produce a third stream that includes sulfur dioxide; and subjecting the third stream to an oxidation reaction to produce a fourth stream that includes sulfur trioxide.

In other aspects, systems for producing sulfuric acid and/or sulfur trioxide are provided herein.

Additional aspects will be set forth in part in the description which follows, and in part will be obvious from the description, or may be learned by practice of the aspects described herein. The advantages described herein may be realized and attained by means of the elements and combinations particularly pointed out in the listing of embodiments and the appended claims. It is to be understood that both the foregoing general description and the following detailed description are exemplary and explanatory only and are not restrictive.

DETAILED DESCRIPTION

Figure 1:
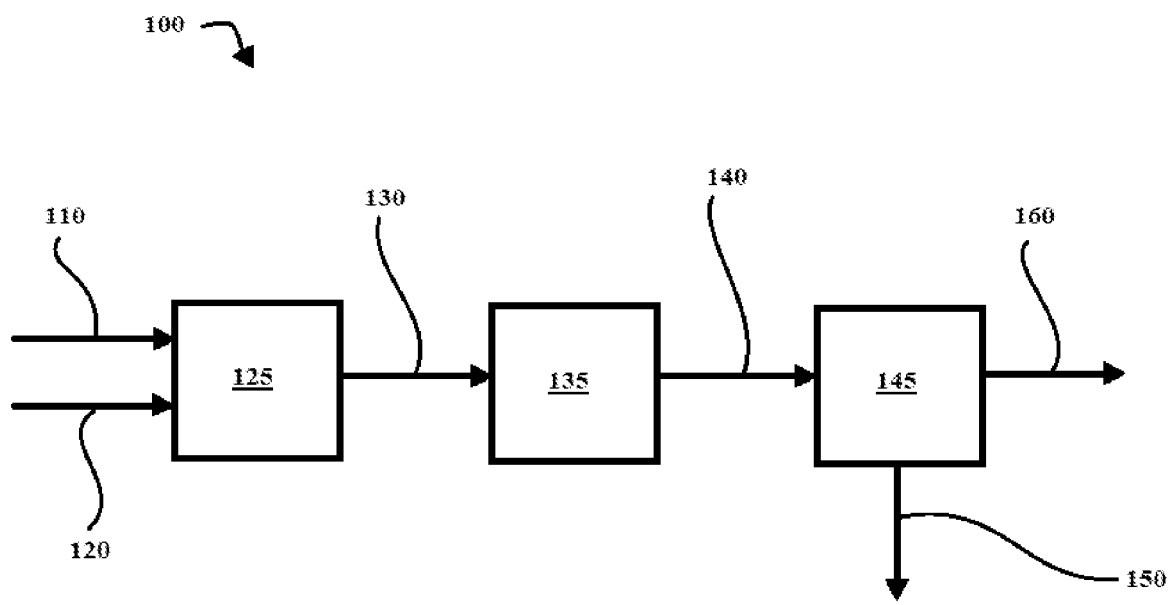
FIG. 1 depicts a flow chart of an embodiment of a method for producing sulfuric acid and/or sulfur trioxide.

Provided herein are methods of producing sulfuric acid and/or sulfur trioxide. The methods described herein may include "providing" one or more streams, and/or "contacting" two or more streams, and/or "subjecting" one or more "streams" to a reaction. The "providing" and/or "contacting" and/or "subjecting" of the "streams" may be achieved or assisted by any technique and/or apparatus known in the art. The one or more streams may include a recited element or compound (e.g., oxygen, sulfur, etc.), and, optionally, one or more other components (e.g., air, $N_2$, etc.) that does not undesirably impact the methods described herein. When one or more other components are present in a stream, the recited element or compound (e.g., oxygen, sulfur, etc.) may be present at any concentration in the stream. A recited element of a stream (e.g., oxygen, sulfur, etc.) may be present in a stream in elemental form or as one or more atoms of a molecule (e.g., sulfur may be present as sulfur dioxide). When a stream is "recycled", at least a portion of the recycled stream may be (i) present during any one or more portions or steps of the methods described herein, such as any "contacting" or "subjecting" limitation, (ii) used as a source of energy (e.g., heat), (iii) disposed in a power generating apparatus (e.g., a fuel cell, turbine, etc.), or (iii) a combination thereof.

First Stream

In some embodiments, the methods include providing a first stream that includes oxygen. The oxygen of the first stream may be in any phase. In some embodiments, the oxygen of the first stream is liquid oxygen. Not wishing to be bound by any particular theory, it is believed that the use of oxygen, instead of air, can eliminate embodiments of the process as a point source of emissions. Performing all or part of embodiments of the processes described herein at relatively higher pressures may improve efficiency, and the use of liquid oxygen may reduce energy consumption associated with higher pressure operation.

The oxygen of the first stream may be obtained from any source or combination of sources. In some embodiments, the providing of the first stream includes electrolyzing water to produce hydrogen and at least a portion of the oxygen of the first stream. The hydrogen may be disposed in a hydrogen cell, which may at least partially power any portion of the methods described herein. For example, the hydrogen cell may at least partially power the electrolyzing. The oxygen of the first stream may be obtained via vacuum swing adsorption (VSA). The oxygen of the first stream may be obtained via pressure swing adsorption (PSA).

Second Stream

In some embodiments, the methods include providing a second stream that includes sulfur. The sulfur of the second stream may be in any phase. For example, the sulfur of the second stream may be solid sulfur or liquid sulfur. The liquid sulfur may be vaporous sulfur. The sulfur of the second stream may be present in the second stream as sulfur dioxide, hydrogen sulfide, hydrogen disulfide, or a combination thereof.

Contacting of First Stream and Second Stream

The methods described herein may include contacting the first stream and the second stream to produce a third stream. The third stream may include sulfur dioxide.

The contacting of the first stream and the second stream may include combusting the first stream and the second stream. The combusting of the first stream and the second stream may be performed in any known apparatus, such as an apparatus having at least one inlet, such as at least one inlet for the first stream, the second stream, and/or any stream that is recycled to the apparatus, as described herein. The first stream and the second stream may be provided to the apparatus at any effective rates, including rates that achieve molar amounts of the first stream and the second stream within the ranges described herein.

In some embodiments, the combusting of the first stream and the second stream includes a single stage combustion.

The combusting of the first stream and the second stream may occur at any effective temperature or range of temperatures. In some embodiments, the combusting occurs at a temperature of about 300° F. to about 2000° F., or about 1250° F. to about 1800° F.

In some embodiments, the contacting of the first stream and the second stream includes contacting a molar amount of oxygen that exceeds a molar amount of sulfur. These molar amounts may be impacted by the one or more streams that may be recycled, as described herein. The molar amount of oxygen may exceed a molar amount of sulfur by any desired amount. For example, the molar amount of oxygen may exceed the molar amount of sulfur by at least 1%, at least 5%, at least 10%, at least 25%, at least 30%, at least 35%, at least 40%, at least 45%, at least 50%, at least 55%, at least 60%, at least 65%, at least 70%, at least 75%, at least 100%, at least 250%, at least 500%, at least 750%, or at least 1,000% (for example, if the molar amount of sulfur is 100 units, and molar amount of oxygen is 150 units or 200 units, then the molar amount of oxygen exceeds the molar amount of sulfur by 50% or 100%, respectively). In some embodiments, a ratio of the molar amount of oxygen to the molar amount of sulfur is about 25:1 to about 1.01:1, about 20:1 to about 1.1:1, about 15:1 to about 1.1:1, about 10:1 to about 1.1:1, about 5:1 to about 1.1:1, about 3:1 to about 1.1:1, or about 2:1 to about 1.1:1.

Third Stream

Sulfur dioxide may be present in the third stream at any concentration. For example, sulfur dioxide may be present in the third stream at an amount of 50% by volume or less, 40% by volume or less, 30% by volume or less, 20% by volume or less, or 10% by volume or less.

Oxidation Reaction of Third Stream

In some embodiments, the methods described herein include subjecting the third stream to an oxidation reaction to produce a fourth stream.

The oxidation reaction may include any oxidation reaction known in the art. In some embodiments, the oxidation reaction occurs in the presence of a catalyst. The catalyst may include any of those known in the art. The catalyst may include a metal, such as platinum, palladium, etc. The catalyst may be a homogeneous catalyst.

The oxidation reaction may occur in any known reactor. In some embodiments, the oxidation reaction occurs in a reactor that is tubular or non-tubular, is quasi-isothermal or adiabatic, operates in a loop configuration, or a combination thereof.

The oxidation reaction may occur at any effective temperature or range of temperatures. In some embodiments, the oxidation reaction occurs at a temperature of about 500° F. to about 1,500° F., about 600° F. to about 1,200° F., or about 700° F. to about 1,000° F.

Fourth Stream

The fourth stream may include sulfur trioxide. The fourth stream may be a gaseous stream. Sulfur trioxide may be present in the fourth stream at any concentration, such as 70% by volume or less, 60% by volume or less, 50% by volume or less, 40% by volume or less, 30% by volume or less, or 20% by volume or less.

In some embodiments, the fourth stream does not include sulfuric acid. In some embodiments, the fourth stream includes sulfuric acid.

In some embodiments, the fourth stream does not include oleum. In some embodiments, the fourth stream includes oleum.

Separation of Fourth Stream

The fourth stream may be subjected to a process that separates the fourth stream into two or more streams, such as the fifth stream and sixth stream described herein. In some embodiments, the methods include separating the fourth stream into (i) a fifth stream that includes gaseous sulfur trioxide, oxygen, or a combination thereof, and (ii) a sixth stream that includes liquid sulfur trioxide.

The separation of the fourth stream may recover any mol % of sulfur trioxide of the fourth stream as the liquid sulfur trioxide of the sixth stream. In some embodiments, the separation of the fourth stream recovers about 10 mol % to about 90 mol %, about 20 mol % to about 80 mol %, about 30 mol % to about 75 mol %, or about 20 mol % to about 70 mol %, of the sulfur trioxide of the fourth stream as the liquid sulfur trioxide of the sixth stream.

The separating of the fourth stream into two or more streams, such as the fifth stream and the sixth stream, may be achieved using any known technique, such as an absorption process or a condensation process. The absorption or condensation may occur at any effective temperature; for example, the absorption or condensation may occur at a temperature of about 50° F. to about 250° F., about 75° F. to about 200° F., about 100° F. to about 175° F., or about 125° F. to about 140° F. Prior to the absorption or condensation of the fourth stream, the fourth stream may be cooled. In some embodiments, the fourth stream is cooled to a temperature of about 100° F. to about 400° F.

A flowchart of an embodiment of a method described herein is depicted at FIG. 1. In the method 100 of FIG. 1, a first stream 110 and a second stream 120 are combusted in a reactor 125 to produce a third stream 130 that includes sulfur dioxide. The third stream 130 is subjected to an oxidation reaction 135 to produce a fourth stream 140 that includes sulfur trioxide. The fourth stream 140 is separated via an absorption or condensation process 145 to produce a fifth stream 150 that includes gaseous sulfur trioxide, oxygen, sulfur dioxide, or any combination thereof, and a sixth stream 160 that includes liquid sulfur trioxide.

Fifth Stream

The fifth stream may include gaseous nitrogen, carbon dioxide, a noble gas, water, sulfur trioxide, oxygen, sulfur dioxide, or any combination thereof. Each of these components may be present in the fifth stream at any concentration. In some embodiments, sulfur dioxide is present in the fifth stream at an amount of 0% to about 50% by volume, 0% to about 40% by volume, 0% to about 30% by volume, 0% to about 20% by volume, 0% to about 15% by volume, or 0% to about 10% by volume.

Recycling of Fifth Stream

The fifth stream may be recycled in embodiments of the methods described herein. In some embodiments, the recycling of the fifth stream includes (i) removing one or more impurities from the fifth stream, (ii) contacting the first stream and the second stream in the presence of all or a portion of the fifth stream, or (iii) a combination thereof. For example, an apparatus in which the contacting of the first stream and the second stream occurs may feature an inlet configured to receive at least a portion of the fifth stream. Since the fifth stream may include oxygen, the first stream and the recycled portion of the fifth stream may be introduced to the apparatus at rates or amounts that achieve a desired mole ratio of oxygen to sulfur, as described herein.

The removing of one or more impurities from the fifth stream may be achieved using any known technique and/or apparatus. In some embodiments, the removing of the one or more impurities from the fifth stream includes subjecting the fifth stream to liquification. The liquification may cause the fifth stream to change phases. For example, the liquification may include providing a fifth stream that is in a gas phase, and converting at least a portion of the fifth stream to a liquid phase. The converting of the fifth stream to a liquid phase may be achieved using any known technique, such as condensation. Generally, liquification may be applied, as needed or desired, to streams other than the fifth stream. In some embodiments, the removing of the one or more impurities from the fifth stream includes contacting the fifth stream with a membrane, such as a gas-gas membrane. The one or more impurities may include any element or compound, especially any element or compound that may undesirably impact an embodiment of a process described herein upon recycling of at least a portion of the fifth stream.

A minor quantity of inert material may be present in a system or process, and a source of the inert material may include a feedstock stream. The inert materials may include, but are not limited to, nitrogen, carbon dioxide, and one or more nobel gases. A system or method described herein may maintain a constant or stable level of inert materials recirculating in the system, such as by purging a portion of a process gas. The purge stream may come from recirculated process gases, and may contain a mixture of $N_2$, $CO_2$, ~5% $O_2$, and ppm levels of $SO_2/SO_3$. By condensing an inert purge stream, embodiments of the systems or methods may not have any process gas point-source-emissions.

Figure 2:
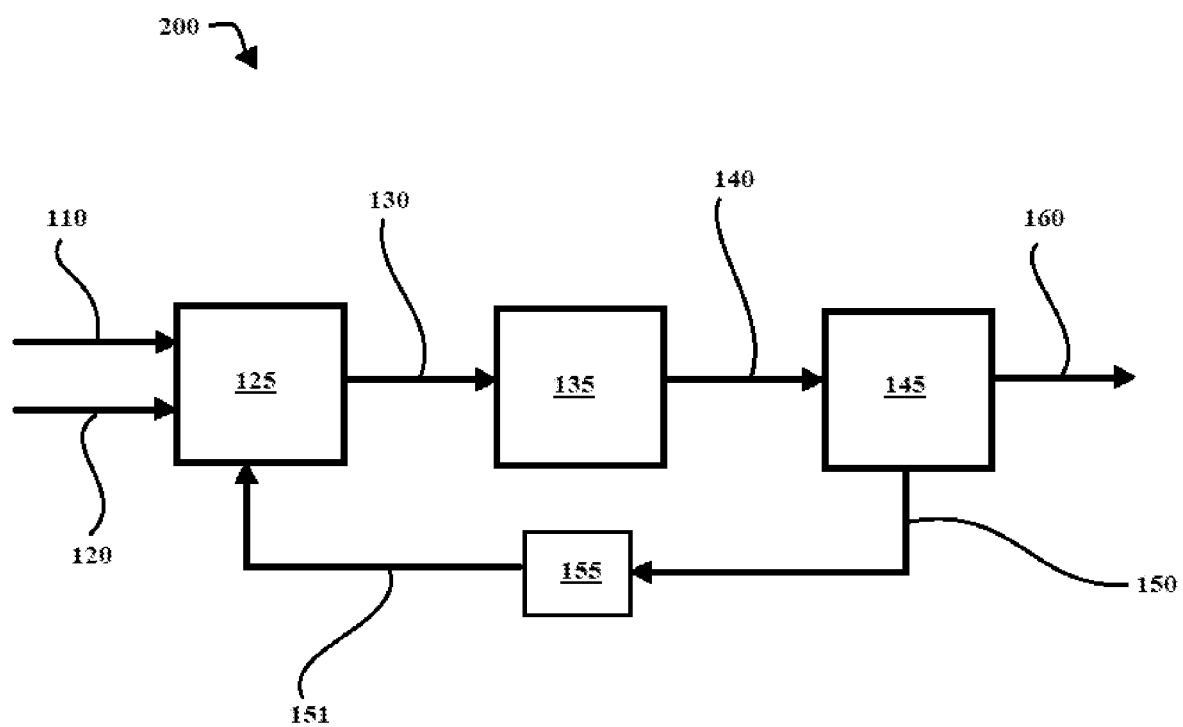
FIG. 2 depicts a flow chart of an embodiment of a method for producing sulfuric acid and/or sulfur trioxide.

A flowchart of an embodiment of a method described herein is depicted at FIG. 2. In the method 200 of FIG. 2, a first stream 110 and a second stream 120 are combusted in a reactor 125 to produce a third stream 130 that includes sulfur dioxide. The third stream 130 is subjected to an oxidation reaction 135 to produce a fourth stream 140 that includes sulfur trioxide. The fourth stream 140 is separated via an absorption or condensation process 145 to produce a fifth stream 150 that includes gaseous sulfur trioxide, oxygen, sulfur dioxide, or any combination thereof, and a sixth stream 160 that includes liquid sulfur trioxide. The fifth stream 150 is contacted with a membrane 155 to remove one or more impurities from the fifth stream to produce a purified fifth stream 151. The purified fifth stream 151 is then disposed in the reactor 125, so that the first stream 110 and the second stream 120 are contacted in the presence of the purified fifth stream 151.

Sixth Stream

The sixth stream, as described herein, may include liquid sulfur trioxide. The liquid sulfur trioxide may be present in the sixth stream at any concentration. For example, liquid sulfur trioxide may be present in the sixth stream at a concentration of at least 50% by volume, at least 60% by volume, at least 70% by volume, at least 80% by volume, at least 90% by volume, at least 95% by volume, or at least 99% by volume.

Dilution of Sixth Stream

The sixth stream produced by the methods described herein may be subjected to further processing to produce one or more other products. The sixth stream, for example, may be diluted. The sixth stream may be diluted with any one or more liquids, such as water or an aqueous liquid (i.e., a liquid that includes greater than 50 wt % of water).

In some embodiments, the methods include diluting the sixth stream to produce a stream that includes sulfuric acid. A concentration of sulfuric acid in this stream may be about 0.01% to 100%, about 50% to about 99.9999%, about 60% to about 99.9999%, about 70% to about 99.9999%, about 80% to about 99.9999%, or about 90% to about 99.9999%, by weight. A temperature of the stream that includes sulfuric acid may be about 40° F. to about 800° F.

In some embodiments, the methods include diluting the sixth stream to produce a stream that includes oleum. A concentration of sulfur trioxide in the stream that includes oleum may be about 0.01% to about 80%, about 10% to about 80%, about 20% to about 80%, about 30% to about 80%, about 40% to about 80%, about 50% to about 80%, or about 60% to about 80%, by mass. A temperature of the stream that includes oleum may be about 40° F. to about 800° F.

Water Vapor Generation and Recycling

Any one or more steps of the methods described herein may generate a seventh stream that includes water, e.g., steam. For example, (i) the contacting of the first stream and the second stream, (ii) the oxidation reaction, (iii) the separation of the fourth stream, or (iv) a combination thereof may produce a seventh stream that includes water.

The water of the seventh stream may be in the form of steam. In some embodiments, at least 0.5, at least 1 (one), or at least 1.5 pound(s) of steam is produced per pound of sulfur trioxide produced by the oxidation reaction.

The seventh stream may be recycled, as described herein. For example, the diluting of the sixth stream may include contacting the sixth stream and the seventh stream. The seventh stream may be disposed in a power generating apparatus. The power generating apparatus may at least partially power (i) the contacting of the first stream and the second stream, (ii) the oxidation reaction, (iii) the separating of the fourth stream, or (iv) a combination thereof.

The seventh stream may be used as a heat source. The heat source may provide at least a portion of heat used for (i) the contacting of the first stream and the second stream, (ii) the oxidation reaction, (iii) the separating of the fourth stream, or (iv) a combination thereof.

When recycled or otherwise, a pressure of the seventh stream may be increased to about 5 psig to about 600 psig, about 50 psig to about 600 psig, about 100 psig to about 600 psig, about 200 psig to about 600 psig, about 300 psig to about 600 psig, about 400 psig to about 600 psig, or about 500 psig to about 600 psig.

Process Environment/Features

The methods described herein, including any portion or step thereof, may be conducted at any effective temperature and pressure, under any effective atmosphere, or a combination thereof. In some embodiments, (i) the combusting of the first stream and the second stream, (ii) the oxidation reaction of the third stream, (iii) the separation of the fourth stream, or (iv) a combination thereof occur(s) (A) at a pressure greater than atmospheric pressure, (B) in a nitrogen-depleted atmosphere, or (C) a combination thereof. The pressure greater than atmospheric pressure may be about 50 psig to about 500 psig, about 100 psig to about 500 psig, about 150 psig to about 500 psig, about 200 psig to about 500 psig, about 250 psig to about 500 psig, about 300 psig to about 500 psig, or about 400 psig to about 500 psig.

In some embodiments, the methods described herein lack a continuous vapor point source emission of sulfur dioxide, sulfur trioxide, sulfuric acid, or a combination thereof.

In some embodiments, the methods described herein are configured to (i) operate on demand with an infinite turn-down capability production, (ii) go on stand-by indefinitely, (iii) ramp-up production quickly (e.g., less than one hour, or less than half an hour), or (iv) a combination thereof.

Sixth Stream Applications

A sixth stream generated by the methods described herein may have a number of uses and applications. For example, a sixth stream may be used in a process for treating, e.g., purifying, a spent acid, such as a spent acid resulting from the application of sulfuric acid or $SO_3$ to chemical processes.

In some embodiments, the methods include providing the sixth stream of any of the methods described herein and/or any stream that includes liquid sulfur trioxide; providing a stream that includes a weak acid; and contacting the stream that includes the weak acid and the sixth stream to produce a stream comprising oleum and a stream comprising >99% sulfuric acid, e.g., 100% sulfuric acid.

The weak acid may have any concentration, such as about 10% to about 50%, or about 20% to about 50%, by weight. The providing of the stream that includes the weak acid may include providing a stream that includes a spent acid; contacting the stream that includes the spent acid and water to form a stream that includes a diluted acid; and separating the stream that includes the diluted acid into an organic product and the stream comprising the weak acid. The separating of the stream that includes the diluted acid may be performed in any known apparatus, such as a water-oil separator. The contacting of the diluted acid and the liquid sulfur trioxide may including mixing the diluted acid and the liquid sulfur trioxide.

The spent acid may include organic materials (e.g., char), water, and sulfuric acid. For example, a spent acid may include about 1% to about 10%, or about 5%, by weight, of char, about 5% to about 20%, or about 10%, by weight, of water, and about 75% to about 95%, or about 85%, by weight, of sulfuric acid.

The diluted acid may have a concentration of about 20% to about 40%, by weight, of sulfuric acid. Not wishing to be bound by any particular theory, it is believed that the acid may act as an ionic solute, and partition into the water. The organic materials, e.g., char, may form a second liquid phase. These phases may be decanted with a water-oil separator. Any remaining acid in the oil may be neutralized. The diluted acid may be re-concentrated to oleum with the sulfur trioxide.

Fractional crystallization may be used to treat a spent acid. In some embodiments, the methods include providing a sixth stream as described herein; providing a stream that includes a spent acid; contacting the sixth stream and the stream that includes the spent acid to form a combined stream; disposing the combined stream in a batch crystallization system to produce a stream that includes sulfuric acid at a concentration of about 85% to about 95%, by weight; and contacting the stream that includes sulfuric acid and a sixth stream that includes liquid sulfur trioxide to produce a stream that includes oleum and a stream that includes 100% sulfuric acid. The batch crystallization system also may produce an organic co-product. These embodiments may achieve separation by freezing point. Non-limiting examples of steps or components that may be used in these embodiments are disclosed in U.S. Pat. Nos. 2,831,043, 2,716,592, 2,862,791, and 1,836,849.

In some embodiments, the methods include providing a sixth stream as described herein; providing a stream that includes a spent acid; and contacting the sixth stream and the stream that includes the spent acid to form a combined stream; and subjecting the combined stream to liquid-liquid extraction and solvent recovery to isolate an organic product. Liquid-liquid extraction may be used to replace one or more organics in a spent acid with fresh feedstock. In some embodiments, the organic concentration in the acids remains substantially constant. One or more organic materials, such as char, may be removed, e.g., "washed", with an organic solvent, including, but not limited to, methyl isobutyl ketone (MIBK), acetone, octane, etc.

In some embodiments, a sixth stream as described herein is added to a spent acid to remove or reduce an amount of residual water. The components, particularly the lighter components, then may be fractionated by boiling point under vacuum. Any sixth stream described herein may be used for at least this purpose in a number of known fractionation processes, including, but not limited to, those disclosed in DE 889889, U.S. Pat. No. 4,980,032, EP 0022473, U.S. Pat. Nos. 2,036,299, 3,294,650, and 2,124,729.

Other methods of treating a spent acid in which a sixth stream as described herein may be used include, but are not limited to, reacting organics with ozone (see, e.g., JPH 11157812, CN 109052338, CN 103771353, and U.S. Pat. No. 3,856,673), electrolytic cell oxidation (see, e.g., U.S. Pat. Nos. 5,547,655, 10,376,866, and 5,523,518), oxygen- and catalyst-based processes (see, e.g., U.S. Pat. No. 7,344,692), photocatalytic destruction (see, e.g., U.S. Pat. No. 5,308,458), biological destruction of organics (see, e.g., CN 1986390), oxidation with hydrogen peroxide (see, e.g., CN 109573960, and JPH 0763703), mixing spent acid and nitric acid (see, e.g., U.S. Pat. No. 2,390,316), using activated carbon or resin (see, e.g., CN 112158809 and FR 2714665), pyrolysis without nitrogen, etc. The pyrolysis without nitrogen may include spraying a mixture into a high-temperature pyrolysis furnace with oxygen, and quenching.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When compositions or methods are claimed or described in terms of "comprising" various steps or components, the compositions or methods can also "consist essentially of" or "consist of" the various steps or components, unless stated otherwise.

The terms "a," "an," and "the" are intended to include plural alternatives, e.g., at least one. For instance, the disclosure of "a catalyst", "a membrane", and the like, is meant to encompass one, or mixtures or combinations of more than one catalyst, membrane, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in some embodiments, that the absorption or condensation occurs at a temperature of about 125° F. to about 140° F. This range should be interpreted as encompassing a temperature of about 125° F. and about 140° F., and further encompasses each of 126° F., 127° F., 128° F., 129° F., 130° F., 131° F., 132° F., 133° F., 134° F., 135° F., 136° F., 137° F., 138° F., and 139° F., including any ranges and sub-ranges between any of these values.

As used herein, the term "about" means plus or minus 10% of the numerical value of the number with which it is being used.

Aspects

Provided below is a non-limiting listing of embodiments of the disclosure:

Embodiment 1. A method of producing sulfuric acid and/or sulfur trioxide, the method comprising, consisting essentially of, or consisting of providing a first stream comprising, consisting essentially of, or consisting of oxygen; providing a second stream comprising, consisting essentially of, or consisting of sulfur; and contacting the first stream and the second stream to produce a third stream, the third stream comprising, consisting essentially of, or consisting of sulfur dioxide.

Embodiment 2. The method of Embodiment 1, further comprising, consisting essentially of, or consisting of subjecting the third stream to an oxidation reaction to produce a fourth stream, the fourth stream comprising, consisting essentially of, or consisting of sulfur trioxide.

Ratios of Oxygen to Sulfur

Embodiment 3. The method of any of the preceding Embodiments, wherein the contacting of the first stream and the second stream comprises, consists of, or consists essentially of contacting a molar amount of oxygen that exceeds a molar amount of sulfur.

Embodiment 4. The method of Embodiment 3, wherein the molar amount of oxygen exceeds the molar amount of sulfur by at least 1%, at least 5%, at least 10%, at least 25%, at least 30%, at least 35%, at least 40%, at least 45%, at least 50%, at least 55%, at least 60%, at least 65%, at least 70%, at least 75%, at least 100%, at least 250%, at least 500%, at least 750%, or at least 1,000% (for example, if the molar amount of sulfur is 100 units, and molar amount of oxygen is 150 units or 200 units, then the molar amount of oxygen exceeds the molar amount of sulfur by 50% or 100%, respectively).

Embodiment 5. The method of Embodiment 3, wherein a ratio of the molar amount of oxygen to the molar amount of sulfur is about 25:1 to about 1.01:1, about 25:1 to about 1.1:1, about 20:1 to about 1.1:1, about 15:1 to about 1.1:1, about 10:1 to about 1.1:1, about 5:1 to about 1.1:1, about 3:1 to about 1.1:1, or about 2:1 to about 1.1:1.

Embodiment 6. The method of Embodiment 3, wherein a ratio of the molar amount of oxygen to the molar amount of sulfur is about 25:1 to about 1.01:1, about 25:1 to about 1.1:1, about 25:1 to about 2:1, about 25:1 to about 3:1, about 25:1 to about 5:1, about 25:1 to about 10:1, about 25:1 to about 15:1, or about 25:1 to about 20:1.

Contacting the First Stream and the Second Stream

Embodiment 7. The method of claim 1, wherein the contacting of the first stream and the second stream comprises, consists essentially of, or consists of combusting the first stream and the second stream, wherein, optionally, the combusting of the first stream and the second stream comprises, consists essentially of, or consists of a single stage combustion.

Embodiment 8. The method of Embodiment 7, wherein the contacting of the first stream and the second stream occurs in a turbine, such as a gas turbine.

Embodiment 9. The method of any of the preceding Embodiments, wherein the combusting occurs at a temperature of about 300° F. to about 2000° F., about 400° F. to about 2000° F., about 500° F. to about 2000° F., about 600° F. to about 2000° F., about 700° F. to about 2000° F., about 800° F. to about 2000° F., about 900° F. to about 2000° F., about 1,000° F. to about 2000° F., about 1,100° F. to about 2000° F., about 1,100° F. to about 1,900° F., or about 1250° F. to about 1800° F.

First Stream

Embodiment 10. The method of any of the preceding Embodiments, wherein the oxygen of the first stream comprises, consists essentially of, or consists of liquid oxygen, oxygen generated via vacuum swing adsorption (VSA), oxygen generated via pressure swing adsorption (PSA), or a combination thereof.

Embodiment 11. The method of any of the preceding Embodiments, wherein the providing of the first stream comprises, consists essentially of, or consists of electrolyzing water to produce hydrogen and at least a portion of the oxygen of the first stream.

Embodiment 12. The method of Embodiment 11, further comprising, consist essentially of, or consisting of disposing the hydrogen in a hydrogen cell.

Embodiment 13. The method of Embodiment 12, wherein the hydrogen cell at least partially powers the electrolyzing of the water.

Second Stream

Embodiment 14. The method of any of the preceding Embodiments, wherein the sulfur of the second stream comprises, consists essentially of, or consists of solid sulfur and/or liquid sulfur, which may be vaporous sulfur.

Embodiment 15. The method of any of the preceding Embodiments, wherein the second stream comprises, consists essentially of, or consists of sulfur dioxide, hydrogen sulfide, hydrogen disulfide, or a combination thereof.

Third Stream

Embodiment 16. The method of any of the preceding Embodiments, wherein sulfur dioxide is present in the third stream at an amount of 50% by volume or less, 40% by volume or less, 30% by volume or less, 20% by volume or less, or 10% by volume or less.

Oxidation Reaction of Third Stream

Embodiment 17. The method of any of the preceding Embodiments, wherein the oxidation reaction occurs in the presence of a catalyst.

Embodiment 18. The method of any of the preceding Embodiments, wherein the catalyst comprises, consists essentially of, or consists of a metal, such as platinum and/or palladium.

Embodiment 19. The method of Embodiment 17 or 18, wherein the catalyst is a homogeneous catalyst.

Embodiment 20. The method of any of the preceding Embodiments, wherein the oxidation reaction occurs in a reactor, such as a reactor that is (i) tubular or non-tubular, (ii) quasi-isothermal or adiabatic, (iii) operates in a loop configuration, or (iv) any combination thereof.

Embodiment 21. The method of any of the preceding Embodiments, wherein the oxidation reaction occurs at a temperature of about 500° F. to about 1,500° F., about 600° F. to about 1,200° F., or about 700° F. to about 1,000° F.

Fourth Stream

Embodiment 22. The method of any of the preceding Embodiments, wherein the fourth stream is a gaseous stream.

Embodiment 23. The method of any of the preceding Embodiments, wherein the fourth stream (i) does not include sulfuric acid, or (ii) includes sulfuric acid.

Embodiment 24. The method of any of the preceding Embodiments, wherein the fourth stream (i) does not include oleum, or (ii) includes oleum.

Embodiment 25. The method of any of the preceding Embodiments, further comprising, consisting essentially of, or consisting of separating the fourth stream into two or more streams, wherein the separating of the fourth stream may result in (i) a fifth stream comprising, consisting essentially of, or consisting of gaseous sulfur trioxide, oxygen, or a combination thereof, and (ii) a sixth stream comprising, consisting essentially of, or consisting of liquid sulfur trioxide.

Embodiment 26. The method of any of the preceding Embodiments, wherein the separating of the fourth stream comprises, consists essentially of, or consists of an absorption or a condensation.

Embodiment 27. The method of Embodiment 26, wherein the absorption or condensation occurs at a temperature of about 50° F. to about 250° F., about 75° F. to about 200° F., about 100° F. to about 175° F., or about 125° F. to about 140° F.

Embodiment 28. The method of any of the preceding Embodiments, further comprising, consisting essentially of, or consisting of, prior to the absorption or the condensation of the fourth stream, cooling the fourth stream to a temperature of about 100° F. to about 400° F.

Embodiment 29. The method of any of the preceding Embodiments, wherein sulfur trioxide is present in the fourth stream at a concentration of (i) 70% by volume or less, 60% by volume or less, 50% by volume or less, 40% by volume or less, 30% by volume or less, or 20% by volume or less, (ii) at least 1% by volume, at least 10% by volume, at least 20% by volume, at least 30% by volume, at least 40% by volume, at least 50% by volume, or (iii) a combination thereof.

Embodiment 30. The method of any of the preceding Embodiments, wherein the separation of the fourth stream recovers about 10 mol % to about 90 mol %, about 20 mol % to about 80 mol %, about 30 mol % to about 75 mol %, or about 20 mol % to about 70 mol %, of the sulfur trioxide of the fourth stream as the liquid sulfur trioxide of the sixth stream.

Fifth Stream

Embodiment 31. The method of any of the preceding Embodiments, wherein the fifth stream comprises, consists essentially of, or consists of gaseous sulfur trioxide, oxygen, sulfur dioxide, or any combination thereof.

Embodiment 32. The method of any of the preceding Embodiments, wherein sulfur dioxide is present in the fifth stream at an amount of 0% to about 50% by volume, 0% to about 40% by volume, 0% to about 30% by volume, 0% to about 20% by volume, 0% to about 15% by volume, 0% to about 10% by volume, 0.1% to about 50% by volume, 0.1% to about 40% by volume, 0.1% to about 30% by volume, 0.1% to about 20% by volume, 0.1% to about 15% by volume, or 0.1% to about 10% by volume.

Recycling of Fifth Stream

Embodiment 33. The method of any one of the preceding Embodiments, further comprising, consisting essentially of, or consisting of recycling the fifth stream.

Embodiment 34. The method of Embodiment 33, wherein the recycling of the fifth stream comprises, consists essentially of, or consists of (i) removing one or more impurities from the fifth stream, (ii) contacting the first stream and the second stream in the presence of all or a portion of the fifth stream, or (iii) a combination thereof.

Embodiment 35. The method of Embodiment 34, wherein the removing of the one or more impurities from the fifth stream comprises, consists essentially of, or consists of contacting the fifth stream with a membrane, such as a gas-gas membrane; or wherein the removing of the one or more impurities from the fifth stream includes subjecting the fifth stream to liquification, wherein, optionally, the liquification may include providing a fifth stream that is in a gas phase, and converting at least a portion of the fifth stream to a liquid phase, such as via condensation.

Sixth Stream

Embodiment 36. The method of any of the preceding Embodiments, further comprising, consisting essentially of, or consisting of diluting the sixth stream to produce a stream comprising, consisting essentially of, or consisting of sulfuric acid.

Embodiment 37. The method of Embodiment 36, wherein a concentration of sulfuric acid in the stream comprising, consisting essentially of, or consisting of sulfuric acid is about 0.01% to 100%, about 50% to about 99.9999%, about 60% to about 99.9999%, about 70% to about 99.9999%, about 80% to about 99.9999%, or about 90% to about 99.9999%, by weight.

Embodiment 38. The method of Embodiment 36 or 37, wherein a temperature of the stream comprising, consisting essentially of, or consisting of sulfuric acid is about 40° F. to about 800° F.

Dilution of Sixth Stream

Embodiment 39. The method of any of the preceding Embodiments, further comprising diluting the sixth stream to produce a stream comprising, consisting essentially of, or consisting of oleum.

Embodiment 40. The method of Embodiment 39, wherein a concentration of sulfur trioxide in the stream comprising, consisting essentially of, or consisting of oleum is about 0.01% to about 80%, by mass.

Embodiment 41. The method of Embodiment 39 or 40, wherein a temperature of the stream comprising, consisting essentially of, or consisting of oleum is about 40° F. to about 800° F.

Embodiment 42. The method of any of the preceding Embodiments, wherein the sixth stream comprises, consists essentially of, or consists of liquid sulfur trioxide.

Embodiment 43. The method of Embodiment 42, wherein the liquid sulfur trioxide may is present in the sixth stream at a concentration of at least 50% by volume, at least 60% by volume, at least 70% by volume, at least 80% by volume, at least 90% by volume, at least 95% by volume, or at least 99% by volume.

Water Vapor Generation and Recycling

Embodiment 44. The method of any of the preceding Embodiments, wherein (i) the contacting of the first stream and the second stream, (ii) the oxidation reaction, (iii) the separation of the fourth stream, or (iv) a combination thereof produces a seventh stream comprising, consisting essentially of, or consisting of water.

Embodiment 45. The method of Embodiment 44, wherein the water of the seventh stream is in the form of steam.

Embodiment 46. The method of Embodiment 45, wherein at least 0.5 pounds, at least 1 (one) pound, or at least 1.5 pounds of the steam is produced per pound of sulfur trioxide produced by the oxidation reaction.

Embodiment 47. The method of any one of the preceding Embodiments, wherein the diluting of the sixth stream comprises, consists essentially of, or consists of contacting the sixth stream and the seventh stream.

Embodiment 48. The method of any of the preceding Embodiments, further comprising, consisting essentially of, or consisting of disposing the seventh stream in a power generating apparatus.

Embodiment 49. The method of Embodiment 48, wherein the power generating apparatus at least partially powers (i) the contacting of the first stream and the second stream, (ii) the oxidation reaction, (iii) the separating of the fourth stream, or (iv) a combination thereof.

Embodiment 50. The method of any of the preceding Embodiments, further comprising, consisting essentially of, or consisting of utilizing the seventh stream as a heat source.

Embodiment 51. The method of Embodiment 50, wherein the heat source provides at least a portion of heat used for (i) the contacting of the first stream and the second stream, (ii) the oxidation reaction, (iii) the separating of the fourth stream, or (iv) a combination thereof.

Embodiment 52. The method of any of the preceding Embodiments, further comprising, consisting essentially of, or consisting of increasing a pressure of the seventh stream to about 5 psig to about 600 psig, about 50 psig to about 600 psig, about 100 psig to about 600 psig, about 200 psig to about 600 psig, about 300 psig to about 600 psig, about 400 psig to about 600 psig, or about 500 psig to about 600 psig.

Process Environment/Features

Embodiment 53. The method of any of the preceding Embodiments, wherein (i) the combusting of the first stream and the second stream, (ii) the oxidation reaction of the third stream, (iii) the separation of the fourth stream, or (iv) a combination thereof occur(s)—(A) at a pressure greater than atmospheric pressure, (B) in a nitrogen-depleted atmosphere, or (C) a combination thereof.

Embodiment 54. The method of Embodiment 53, wherein the pressure greater than atmospheric pressure is about 50 psig to about 500 psig, about 100 psig to about 500 psig, about 150 psig to about 500 psig, about 200 psig to about 500 psig, about 250 psig to about 500 psig, about 300 psig to about 500 psig, or about 400 psig to about 500 psig.

Embodiment 55. The method of any one of the preceding Embodiments, wherein the method lacks a continuous vapor point source emission of sulfur dioxide, sulfur trioxide, sulfuric acid, or a combination thereof.

Embodiment 56. The method of any one of the preceding Embodiments, wherein the method is configured to (i) operate on demand with an infinite turn-down capability production, (ii) go on stand-by indefinitely, (iii) ramp-up production quickly (e.g., less than one hour), or (iv) a combination thereof.

Sixth Stream Applications

Embodiment 57. The method of any of the preceding Embodiments, further comprising, consisting essentially of, or consisting of providing the sixth stream of any of the preceding Embodiments; providing a stream comprising, consisting essentially of, or consisting of a weak acid; and contacting the stream comprising, consisting essentially of, or consisting of the weak acid and the sixth stream to produce a stream comprising, consisting essentially of, or consisting of oleum and a stream comprising, consisting essentially of, or consisting of >99% sulfuric acid.

Embodiment 58. The method of Embodiment 57, wherein the weak acid has a concentration of about 20% to about 50%, by weight.

Embodiment 59. The method of Embodiment 58 or 59, wherein the providing of the stream comprising, consisting essentially of, or consisting of the weak acid comprises, consists essentially of, or consists of providing a stream comprising, consisting essentially of, or consisting of a spent acid; contacting the stream comprising, consisting essentially of, or consisting of the spent acid and water to form a stream comprising, consisting essentially of, or consisting of a diluted acid; and separating the stream comprising, consisting essentially of, or consisting of the diluted acid into an organic product and the stream comprising, consisting essentially of, or consisting of the weak acid.

Embodiment 60. The method of any of the preceding Embodiments, wherein the separating of the stream comprising, consisting essentially of, or consisting of the diluted acid is performed in a water-oil separator.

Embodiment 61. The method of any of the preceding Embodiments, wherein the spent acid comprises, consists essentially of, or consists of one or more organic materials (e.g., char), water, and sulfuric acid; for example, the spent acid may include about 1% to about 10%, or about 5%, by weight, of char, about 5% to about 20%, or about 10%, by weight, of water, and about 75% to about 95%, or about 85%, by weight, of sulfuric acid.

Embodiment 62. The method of any of the preceding Embodiments, further comprising, consisting essentially of, or consisting of providing the sixth stream; providing a stream comprising, consisting essentially of, or consisting of a spent acid; contacting the sixth stream and the stream comprising, consisting essentially of, or consisting of the spent acid to form a combined stream; and subjecting the combined stream to liquid-liquid extraction and solvent recovery to isolate an organic product.

Embodiment 63. The method of any of the preceding Embodiments, further comprising, consisting essentially of, or consisting of providing the sixth stream; providing a stream comprising, consisting essentially of, or consisting of a spent acid; contacting the sixth stream and the stream comprising, consisting essentially of, or consisting of the spent acid to form a combined stream; disposing the combined stream in a batch crystallization system to produce a stream comprising, consisting essentially of, or consisting of sulfuric acid at a concentration of about 85% to about 95%, by weight; and contacting the stream comprising, consisting essentially of, or consisting of sulfuric acid and the sixth stream to produce a stream comprising, consisting essentially of, or consisting of oleum and a stream comprising, consisting essentially of, or consisting of 100% sulfuric acid.

Embodiment 64. The method of any of the preceding Embodiments, the method further comprising, consisting essentially of, or consisting of providing the sixth stream; and treating a spent acid or a diluted acid with the sixth stream as described herein.

Embodiment 65. The method of any of the preceding Embodiments, wherein the diluted acid has a concentration of about 20% to about 40%, by weight, of sulfuric acid.

Embodiment 66. A method as depicted at FIG. 1, wherein, optionally, the method further comprises any one or more limitations of any of the preceding Embodiments.

Embodiment 67. A method as depicted at FIG. 2, wherein, optionally, the method further comprises any one or more limitations of any of the preceding Embodiments.

Embodiment 68. A system for performing any one of more elements of the method of any of the preceding Embodiments.

EXAMPLES

The present disclosure is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1-Simulation of Reaction

As described herein, FIG. 1 depicts a flowchart of an embodiment of a method, and this embodiment was simulated in this example. Therefore, the reference numbers used in this example correspond to those of FIG. 1.

In this example, the first stream 110 and a second stream 120 were combusted in a furnace 125. The first stream 110 and the second stream 120 of this example had the following characteristics:

| Component | Units | First Stream 110 | Second Stream 120 |
|---|---|---|---|
| Sulfur | lbmol/hr | 0 | 135.94 |
| | mol % | 0 | 100 |
| $O_2$ | lbmol/hr | 184.8 | 0 |
| | mol % | 17 | 0 |
| $SO_2$ | lbmol/hr | 0 | 0 |
| | mol % | 0 | 0 |
| $SO_3$ | lbmol/hr | 13.1 | 0 |
| | mol % | 1 | 0 |

-continued

| Component | Units | First Stream 110 | Second Stream 120 |
|---|---|---|---|
| $N_2$ | lbmol/hr | 858.0 | 0 |
| | mol % | 81 | 0 |
| Total | lbmol/hr | 1,055.9 | 135.9 |
| | mol % | 100 | 100 |

The combustion of the first stream 110 and the second stream 120 produced a third stream 130 that included sulfur dioxide, specially 6 mol % of sulfur dioxide, as explained at the following table.

| Component | Units | Third Stream 130 |
|---|---|---|
| Sulfur | lbmol/hr | 0 |
| | mol % | 0 |
| $O_2$ | lbmol/hr | 156.3 |
| | mol % | 7 |
| $SO_2$ | lbmol/hr | 135.9 |
| | mol % | 6 |
| $SO_3$ | lbmol/hr | 34.6 |
| | mol % | 1 |
| $N_2$ | lbmol/hr | 1,995 |
| | mol % | 86 |
| Total | lbmol/hr | 2,322 |
| | mol % | 100 |

The third stream 130 was subjected to an oxidation reaction 135 to produce a fourth stream 140 that included sulfur trioxide, specifically 7 mol % of sulfur trioxide, as demonstrated by the following table:

| Component | Units | Fourth Stream 140 |
|---|---|---|
| Sulfur | lbmol/hr | 0 |
| | mol % | 0 |
| $O_2$ | lbmol/hr | 91.1 |
| | mol % | 4 |
| $SO_2$ | lbmol/hr | 5.44 |
| | mol % | 0.24 |
| $SO_3$ | lbmol/hr | 165.1 |
| | mol % | 7 |
| $N_2$ | lbmol/hr | 1,995 |
| | mol % | 88 |
| Total | lbmol/hr | 2,257 |
| | mol % | 100 |

The fourth stream 140 then may be subjected to any of the further processing limitations disclosed herein.

Example 2-Simulation of Reaction Configured for High Heat Recovery

As described herein, FIG. 1 depicts a flowchart of an embodiment of a method, and this embodiment was simulated in this example. Therefore, the reference numbers used in this example correspond to those of FIG. 1.

In this example, the first stream 110 and a second stream 120 were combusted in a furnace 125. The first stream 110 and the second stream 120 of this example had the characteristics provided in the following table. The oxygen of the first stream 110 of this example was generated via vacuum swing adsorption (VSA). The sulfur of the second stream 120 of this example was primarily in the form of hydrogen sulfide ($H_2S$).

| Component | Units | First Stream 110 Temperature - 150° F. (65.7° C.) (Vapor Phase) | Second Stream 120 Temperature - 150° F. (66° C.) (Vapor Phase) |
|---|---|---|---|
| Sulfur | lbmol/hr | 0 | * |
| | mol % | 0 | |
| $O_2$ | lbmol/hr | 275.0 | 0 |
| | mol % | 92.5 | 0 |
| $SO_2$ | lbmol/hr | 0 | 134.0 |
| | mol % | 0 | 97.0 |
| $SO_3$ | lbmol/hr | 0 | 0 |
| | mol % | 0 | 0 |
| $N_2$ | lbmol/hr | 22.3 | 0 |
| | mol % | 7.5 | 0 |
| $H_2O$ | lbmol/hr | | 1.4 |
| | mol % | | 1.0 |
| $CO_2$ | lbmol/hr | | 2.8 |
| | mol % | | 2 |
| Total | lbmol/hr | 297.3 | 138.1 |
| | mol % | 100 | 100 |

* The Second Stream was accompanied by a liquid stream of sulfur, which provided sulfur at a rate of 1.94 lbol/hr at a temperature of 135° C. (275° F.).

The combustion of the first stream 110 and the second stream 120 produced a third stream 130 that is characterized at the following table. The third stream 130 of this example had a temperature greater than 1,000° C.

| Component | Units | Third Stream 130 Temperature - 1,083° C. (1981° F.) |
|---|---|---|
| Sulfur | lbmol/hr | 0 |
| | mol % | 0 |
| $O_2$ | lbmol/hr | 175.3 |
| | mol % | 0 |
| $SO_2$ | lbmol/hr | 124.1 |
| | mol % | 5 |
| $SO_3$ | lbmol/hr | 13.6 |
| | mol % | 1 |
| $N_2$ | lbmol/hr | 1,590 |
| | mol % | 70 |
| $H_2O$ | lbmol/hr | 135.4 |
| | mol % | 6 |
| $CO_2$ | lbmol/hr | 228 |
| | mol % | 10 |
| Total | lbmol/hr | 2,266.1 |
| | mol % | 100 |

The invention claimed is:

1. A method of producing a product, the method comprising:
providing a first stream comprising oxygen;
providing a second stream comprising sulfur;
contacting the first stream and the second stream to produce a third stream, the third stream comprising sulfur dioxide, wherein the contacting of the first stream and the second stream comprises contacting a molar amount of oxygen that exceeds a molar amount of sulfur, wherein the molar amount of oxygen exceeds the molar amount of sulfur by at least 100%; and
subjecting the third stream to an oxidation reaction to produce a fourth stream, the fourth stream comprising sulfur trioxide;
wherein the contacting of the first stream and the second stream comprises combusting the first stream and the second stream, and the combusting of the first stream and the second stream comprises a single stage combustion.

2. The method of claim 1, wherein the molar amount of oxygen exceeds the molar amount of sulfur by at least 250%.

3. The method of claim 1, wherein a ratio of the molar amount of oxygen to the molar amount of sulfur is about 25:1 to 2:1 (molar amount of oxygen:molar amount of sulfur).

4. The method of claim 1, wherein sulfur dioxide is present in the third stream at an amount of 50% by volume or less.

5. The method of claim 1, wherein the fourth stream is a gaseous stream, the fourth stream comprises sulfuric acid, the fourth stream comprises oleum, or a combination thereof.

6. The method of claim 1, further comprising separating the fourth stream into (i) a fifth stream comprising gaseous sulfur trioxide, oxygen, or a combination thereof, and (ii) a sixth stream comprising liquid sulfur trioxide.

7. The method of claim 6, further comprising recycling the fifth stream, wherein the recycling of the fifth stream comprises (i) removing one or more impurities from the fifth stream, (ii) contacting the first stream and the second stream in the presence of all or a portion of the fifth stream, (iii) subjecting the third stream to the oxidation reaction in the presence of all or a portion of the fifth stream, or (iv) a combination thereof.

8. The method of claim 7 wherein the removing of the one or more impurities from the fifth stream comprises contacting the fifth stream with a membrane, subjecting the fifth stream to liquification, or a combination thereof.

9. The method of claim 6, wherein the separation of the fourth stream recovers at least 80 mol % of the sulfur trioxide of the fourth stream as the liquid sulfur trioxide of the sixth stream.

10. The method of claim 6, further comprising diluting the sixth stream to produce a stream comprising sulfuric acid, wherein a concentration of sulfuric acid in the stream comprising sulfuric acid is about 50% to about 99.9999% by mass.

11. The method of claim 6, further comprising diluting the sixth stream to produce a stream comprising oleum.

12. The method of claim 1, wherein the oxygen of the first stream comprises liquid oxygen, oxygen generated via vacuum swing adsorption (VSA), oxygen generated via pressure swing adsorption (PSA), or a combination thereof.

13. The method of claim 1, wherein the providing of the first stream comprises electrolyzing water to produce hydrogen and at least a portion of the oxygen of the first stream.

14. The method of claim 13, further comprising disposing the hydrogen in a hydrogen cell.

15. The method of claim 1, wherein, optionally, the method further comprises separating the fourth stream into (i) a fifth stream comprising gaseous sulfur trioxide, oxygen, or a combination thereof, and (ii) a sixth stream comprising liquid sulfur trioxide, and
wherein (i) the contacting of the first stream and the second stream, (ii) the oxidation reaction, (iii) the separation of the fourth stream, or (iv) a combination thereof produces a seventh stream comprising water.

16. The method of claim 15, further comprising diluting the sixth stream to produce a stream comprising sulfuric acid or oleum, wherein the diluting of the sixth stream comprising contacting the sixth stream and the seventh stream.

17. The method of claim 15, further comprising disposing the seventh stream in a power generating apparatus.

18. The method of claim 1, wherein, optionally, the method further comprises separating the fourth stream into (i) a fifth stream comprising gaseous sulfur trioxide, oxygen, or a combination thereof, and (ii) a sixth stream comprising liquid sulfur trioxide; and
    wherein (i) the combusting of the first stream and the second stream, (ii) the oxidation reaction of the third stream, (iii) the separation of the fourth stream, or (iv) a combination thereof occur(s)—
    (A) at a pressure greater than atmospheric pressure,
    (B) in a nitrogen-depleted atmosphere, or
    (C) a combination thereof.

19. The method of claim 6, further comprising:
providing a stream comprising a weak acid; and
contacting the stream comprising the weak acid and the sixth stream to produce a stream comprising oleum and a stream comprising >99% sulfuric acid.

20. The method of claim 19, wherein the providing of the stream comprising the weak acid comprises:
providing a stream comprising a spent acid;
contacting the stream comprising the spent acid and water to form a stream comprising a diluted acid; and
separating the stream comprising the diluted acid into an organic product and the stream comprising the weak acid.

21. The method of claim 6, further comprising:
providing a stream comprising a spent acid;
contacting the sixth stream and the stream comprising the spent acid to form a combined stream; and
subjecting the combined stream to liquid-liquid extraction and solvent recovery to isolate an organic product.

22. The method of claim 6, further comprising:
providing a stream comprising a spent acid;
contacting the sixth stream and the stream comprising the spent acid to form a combined stream;
disposing the combined stream in a batch crystallization system to produce a stream comprising sulfuric acid at a concentration of about 85% to about 95%, by weight; and
contacting the stream comprising sulfuric acid and the sixth stream to produce a stream comprising oleum and a stream comprising 100% sulfuric acid.

23. The method of claim 6, the method further comprising:
treating a spent acid or a diluted acid with the sixth stream.

24. A method of producing a product, the method comprising:
providing a first stream comprising oxygen;
providing a second stream comprising sulfur;
contacting the first stream and the second stream to produce a third stream, the third stream comprising sulfur dioxide, wherein the contacting of the first stream and the second stream comprises contacting a molar amount of oxygen that exceeds a molar amount of sulfur, wherein the molar amount of oxygen exceeds the molar amount of sulfur by at least 30%; and
subjecting the third stream to an oxidation reaction to produce a fourth stream, the fourth stream comprising sulfur trioxide, sulfuric acid, oleum, or a combination thereof.

25. The method of claim 1, wherein the oxidation reaction occurs in a reactor that (i) is tubular or non-tubular, (ii) is quasi-isothermal or adiabatic, (iii) operates in a loop configuration, or (iv) a combination thereof.

26. The method of claim 15, further comprising increasing a pressure of the seventh stream to about 5 psig to about 600 psig.

27. The method of claim 18, wherein the pressure greater than atmospheric pressure is about 50 psig to about 500 psig.

28. The method of claim 1, wherein sulfur dioxide is present in the third stream at an amount of 16% to 50%, by volume.

29. The method of claim 28, wherein (i) the combusting of the first stream and the second stream, (ii) the oxidation reaction of the third stream, or (iii) a combination thereof occurs at a pressure of about 10 psig to about 500 psig.

30. The method of claim 1, wherein the sulfur of the second stream comprises hydrogen sulfide.

* * * * *